United States Patent
Bretthauer

(10) Patent No.: US 10,210,696 B2
(45) Date of Patent: Feb. 19, 2019

(54) INTEGRATED FUEL DISPENSING AND ACCOUNTING SYSTEM

(71) Applicant: Kevin A. Bretthauer, Hillsboro, OR (US)

(72) Inventor: Kevin A. Bretthauer, Hillsboro, OR (US)

(73) Assignee: Fuel Cloud IP Holding, LLC, Hillsboro, OR (US)

( * ) Notice: Subject to any disclaimer, the term of this patent is extended or adjusted under 35 U.S.C. 154(b) by 0 days.

(21) Appl. No.: 14/998,150

(22) Filed: Dec. 23, 2015

(65) Prior Publication Data

US 2017/0188180 A1 Jun. 29, 2017

(51) Int. Cl.
*H04W 4/80* (2018.01)
*G07F 17/00* (2006.01)
*H04M 11/00* (2006.01)

(52) U.S. Cl.
CPC ......... *G07F 17/0014* (2013.01); *H04M 11/00* (2013.01); *H04W 4/80* (2018.02)

(58) Field of Classification Search
CPC ........... G06F 12/14; G06F 17/00; G06F 21/35
USPC ...... 340/5.92, 870.02, 870.03; 700/244, 231, 700/232, 237
See application file for complete search history.

(56) References Cited

U.S. PATENT DOCUMENTS

| | | | | |
|---|---|---|---|---|
| 5,249,612 A * | 10/1993 | Parks | .................... | B67D 7/348 141/219 |
| 5,913,180 A * | 6/1999 | Ryan | .................... | B67D 7/145 235/375 |
| 5,923,572 A * | 7/1999 | Pollock | .................. | B67D 7/222 141/94 |
| 6,470,233 B1 * | 10/2002 | Johnson, Jr. | ........... | B67D 7/067 141/351 |
| 6,895,240 B2 * | 5/2005 | Laursen | .................. | H04L 29/06 455/411 |
| 8,292,168 B2 * | 10/2012 | Vilnai | ...................... | B67D 7/34 235/381 |
| 9,288,610 B2 * | 3/2016 | Son | ......................... | H04W 4/70 |
| 2002/0014952 A1* | 2/2002 | Terranova | ............. | B67D 7/067 340/5.61 |
| 2003/0018589 A1* | 1/2003 | Jones | ..................... | G06Q 30/06 705/413 |
| 2003/0130902 A1* | 7/2003 | Athwal | .................. | G06Q 30/06 705/26.1 |
| 2004/0257195 A1* | 12/2004 | Atkinson | ........... | G07C 9/00103 340/5.2 |
| 2009/0025824 A1* | 1/2009 | Noujima | ................... | C01B 3/26 141/93 |
| 2009/0029016 A1* | 1/2009 | Pfister | .................... | F25D 11/02 426/231 |

(Continued)

*Primary Examiner* — Carlos Garcia

(74) *Attorney, Agent, or Firm* — Mersenne Law

(57) ABSTRACT

An interface system extends a prior-art fuel delivery pump and reservoir so that authorization to activate the fuel delivery pump can be obtained from a remote authorization service over a long-range wireless communication link such as a cellular telephone connection or a satellite connection; and delivered to the interface system over a different, short-range wireless communication link such as a Bluetooth® connection or a WiFi connection. The system is structured so that different data link devices can serve in one part of the communication chain. Other features and characteristics of the system are described and claimed.

11 Claims, 6 Drawing Sheets

(56) References Cited

U.S. PATENT DOCUMENTS

| | | | | |
|---|---|---|---|---|
| 2009/0145321 A1* | 6/2009 | Russell | ............... | F42B 4/00 |
| | | | | 102/215 |
| 2009/0256708 A1* | 10/2009 | Hsiao | ............. | G06K 19/0723 |
| | | | | 340/572.1 |
| 2010/0188251 A1* | 7/2010 | Panuce | ............. | G08C 17/02 |
| | | | | 340/12.22 |
| 2010/0265033 A1* | 10/2010 | Cheung | ............. | G07F 13/025 |
| | | | | 340/5.64 |
| 2013/0035788 A1* | 2/2013 | Divelbiss | ............. | B67D 7/04 |
| | | | | 700/244 |
| 2013/0232019 A1* | 9/2013 | Frieden | ............. | G06Q 20/3278 |
| | | | | 705/17 |
| 2014/0207277 A1* | 7/2014 | Broome | ............. | G06Q 20/32 |
| | | | | 700/237 |
| 2015/0120474 A1* | 4/2015 | Webb | ............. | B67D 7/04 |
| | | | | 705/18 |
| 2015/0130630 A1* | 5/2015 | Outwater | ............. | G01D 4/006 |
| | | | | 340/870.02 |
| 2015/0145647 A1* | 5/2015 | Engel-Dahan | ..... | G07C 9/00571 |
| | | | | 340/5.61 |
| 2015/0278843 A1* | 10/2015 | Lawe | ............. | G06Q 30/0222 |
| | | | | 705/14.23 |
| 2016/0019526 A1* | 1/2016 | Granbery | ............. | G06Q 30/0635 |
| | | | | 705/26.81 |
| 2016/0035001 A1* | 2/2016 | Driscoll | ............. | G06Q 30/0631 |
| | | | | 705/26.7 |
| 2016/0181886 A1* | 6/2016 | Larsson | ............. | H02K 5/15 |
| | | | | 310/71 |
| 2018/0033029 A1* | 2/2018 | Lin | ............. | H04B 17/23 |

* cited by examiner

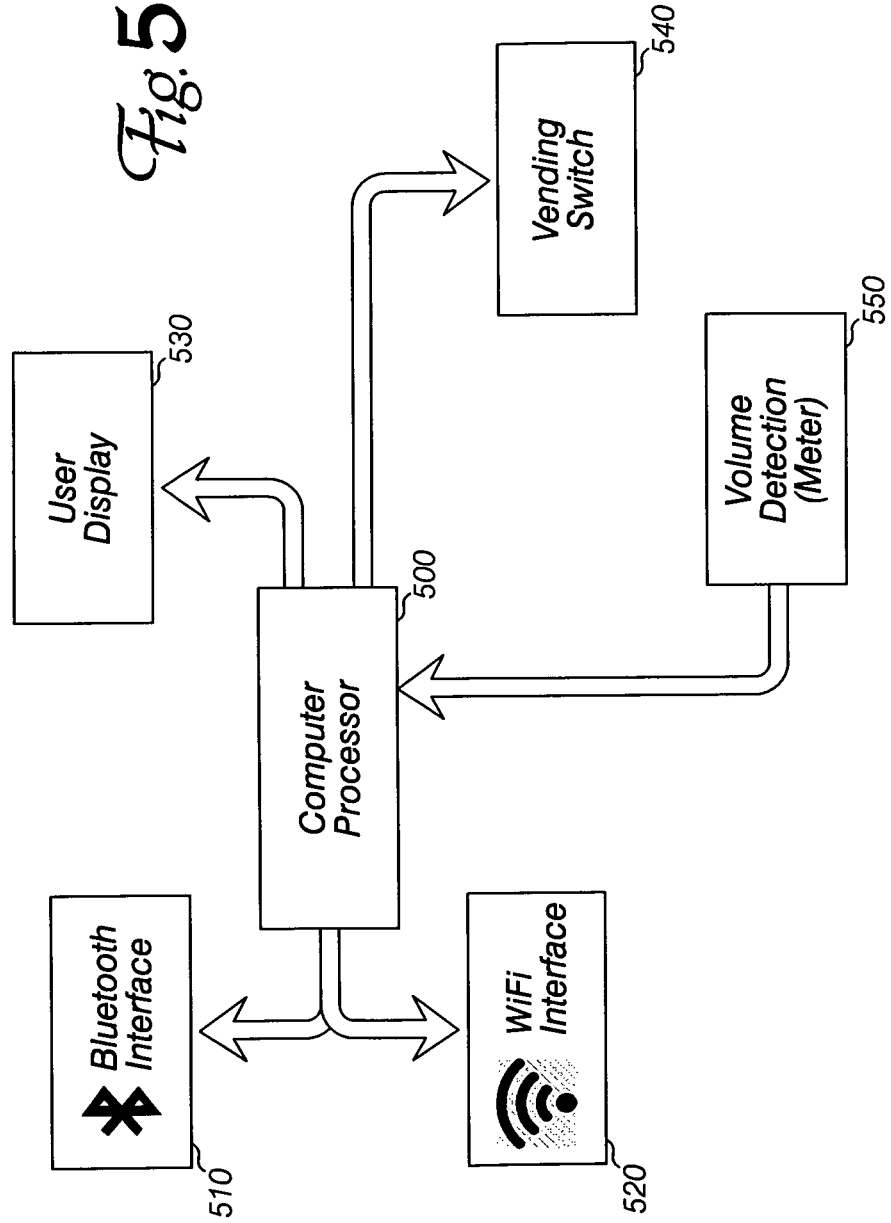

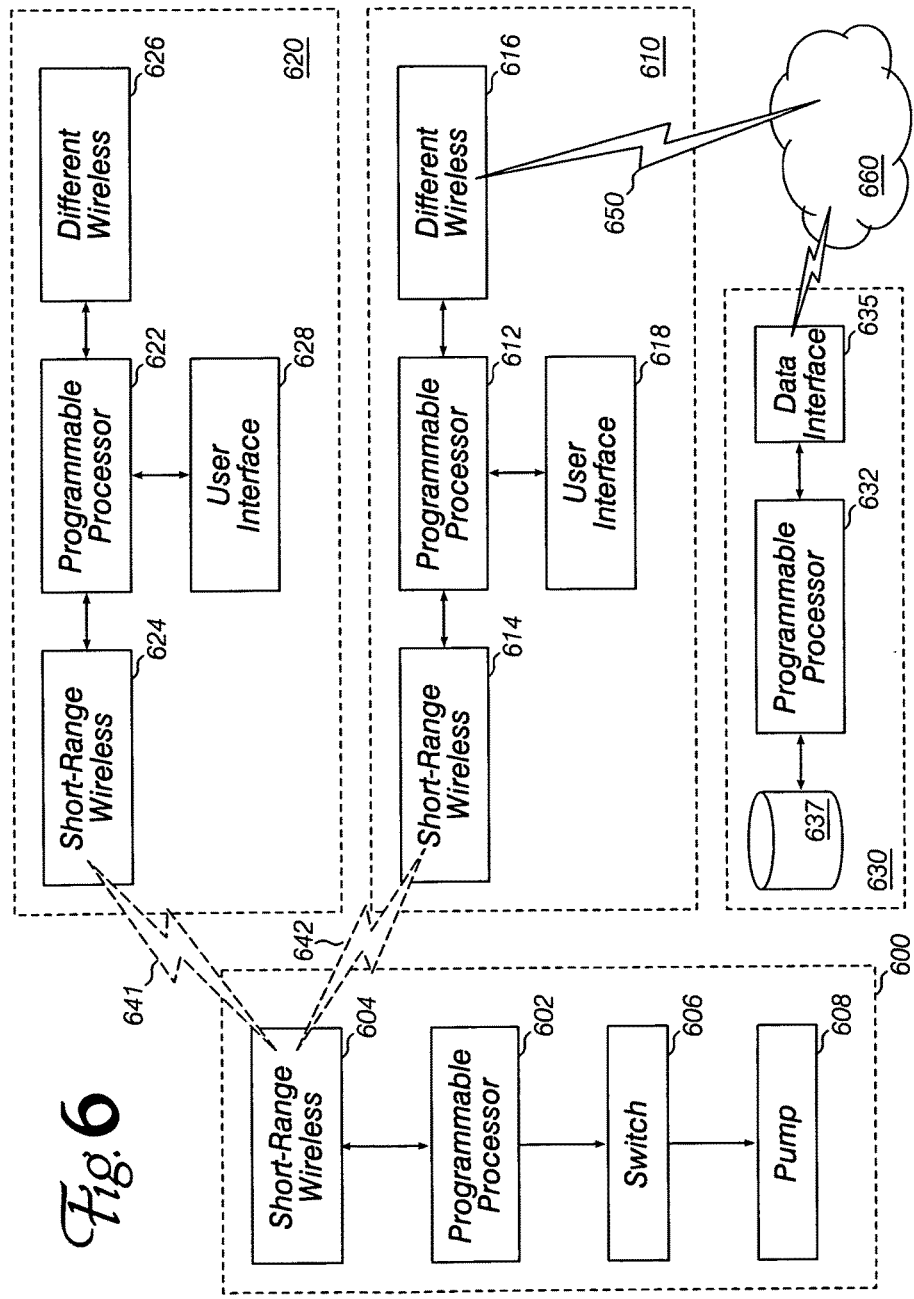

INTEGRATED FUEL DISPENSING AND ACCOUNTING SYSTEM

CONTINUITY AND CLAIM OF PRIORITY

This is an original U.S. patent application.

FIELD

The invention relates to wireless communication systems for obtaining authorization to activate a vending or dispensing system when certain conditions have been satisfied or preapproval given, and for reporting information about the product sold or dispensed upon such activation.

BACKGROUND

In the century (give or take) since the development of the liquid-fueled internal combustion engine and vehicles based thereupon, a vast supporting infrastructure of fuel production, refinement, distribution and sales has grown up. Some portions of the infrastructure are very familiar to residents of industrialized countries: almost everyone has at least a general understanding of how petroleum-based fuels are extracted, refined, delivered to local filling stations, pumped into vehicles and paid for. However, there are many non-standard niches in the infrastructure—for example, for unusual fuels such as hydrogen, propane, liquid natural gas, kerosene or alcohol—and for delivery outside standard retail fueling stations.

One significant, if unfamiliar, niche is fleet fueling: the provision of fuels to a fleet of commonly-owned and -operated vehicles, where an individual vehicle "fill-up" may not correspond with a single commercial transaction. Instead, the fleet operator may purchase a large quantity of fuel and deliver it to its vehicles through one or more private pumping stations. Nevertheless, even if these pumps do not perform an individual commercial transaction (e.g., by accepting cash or by submitting a credit-card authorization) they often must verify that the vehicle is authorized to obtain fuel from the station, or report fuel dispensing so that replacement stock can be ordered and delivered before the tanks run dry.

A system that provides improved connectivity and reduced cost for non-consumer/non-retail fueling stations may be of significant value in this field.

SUMMARY

Embodiments of the invention comprise general-purpose computing hardware configured with software to perform a communications-interface function, and coupled with special-purpose electronic or electromechanical hardware to control a prior-art "dumb" fuel-dispensing pump according to a new control and communications procedure.

BRIEF DESCRIPTION OF DRAWINGS

FIG. 5 is a block diagram of a practical embodiment of the invention.

FIG. 6 is a system diagram illustrating how a device participating in an embodiment may be exchanged for a different device which fulfills the same role.

DETAILED DESCRIPTION

Embodiments of the invention are add-on modules that extend the capabilities of prior-art fuel dispensing pumps to include authorization to operate and, in some embodiments, reporting of quantity dispensed and other information. Some embodiments may comprise a complete fuel-dispensing system, including pumps, hoses, nozzles and tanks.

Figure 1:
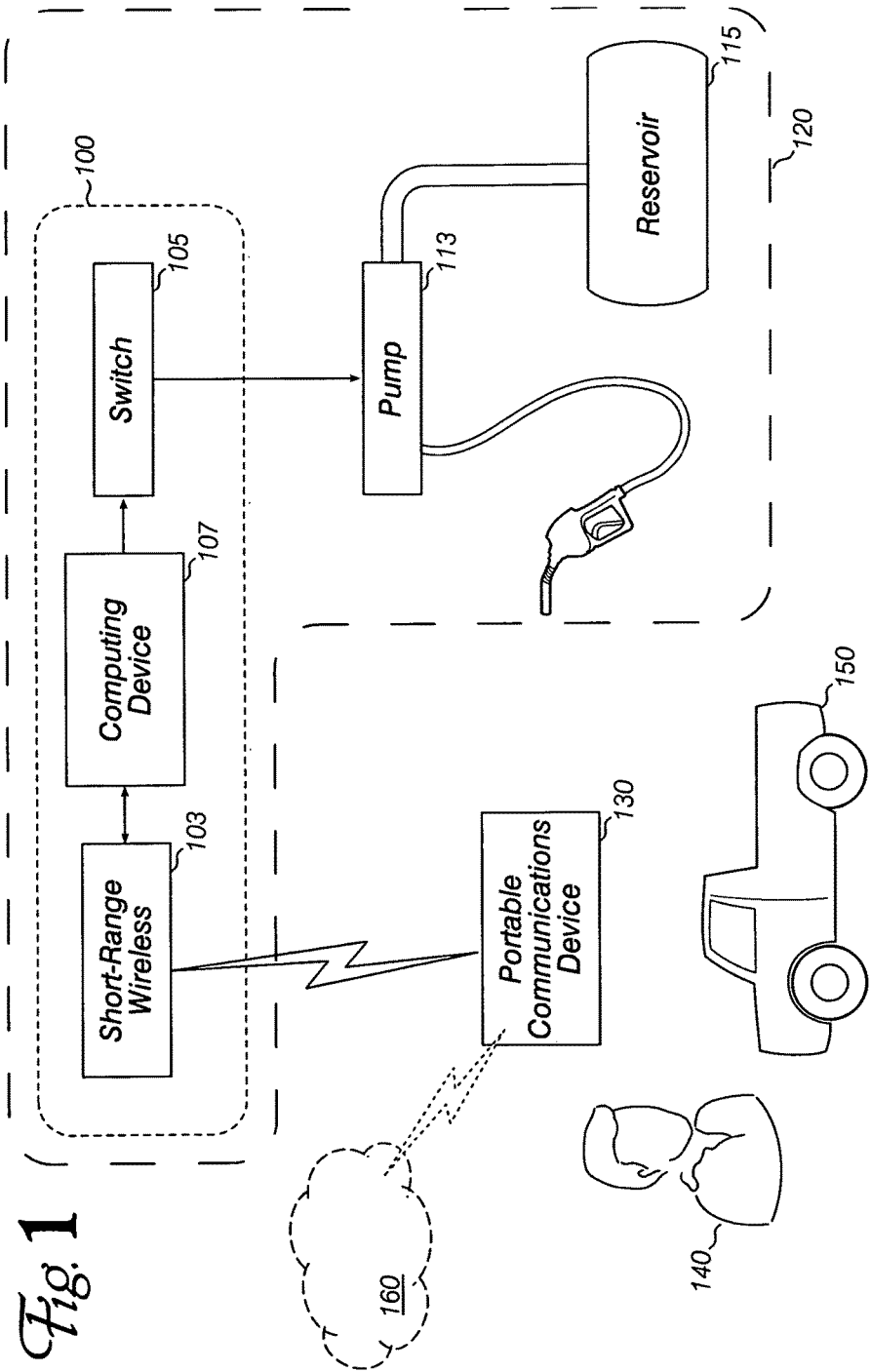
FIG. 1 is a block diagram of an embodiment, showing functional units and their interconnections with the complete system within which the embodiment operates.

FIG. 1 shows a block diagram including elements of an embodiment and its surrounding environment. The simplest embodiment 100 includes a short-range wireless transceiver 103, an electronically-controlled switch 105 and a computing device 107 to coordinate the operations of the transceiver 103 and switch 105 according to a set of instructions and data discussed below. Simple embodiment 100 may be coupled to an existing fuel pump 113 and reservoir 115, or a more complete system 120 according to the invention may include all of wireless transceiver 103, switch 105, computing device 107, fuel pump 113 and reservoir 115.

An embodiment (100 or 120) interacts with a separate portable communication device 130 that is brought into communication with the embodiment by a user 140, who may operate the combined system to obtain fuel for a vehicle 150. The embodiment (100 or 120) communicates with the portable communication device 130 to authorize and/or account for fuel dispensed. The communication device 130 may have access to a broader distributed data network 160 such as the Internet, and the embodiment may use this access to communicate with a remote server for authentication, accounting or other data-exchange purposes.

It is appreciated that a traditional fueling station may include many similar elements: a reservoir 115, pump 113, switch 105 and computing device 107; and some mechanism for communicating with a remote site for authorizing payment. However, such systems are typically comprised of a fixed set of components, whereas in an embodiment, the portable data communications device 130 with which the embodiment communicates is brought to the site by a user and carried away by the user. A different user will bring a different data communications device, and the embodiment will use this second, different device instead of the first. An embodiment may not operate at all if the user fails to bring a portable data communication device, or it may only operate in a limited-functionality fallback mode. For example, in an autonomous fueling station, if no data communication device is available, fuel may only be provided to individuals who have a mechanical key to operate a physical lock, or who have a secret code or PIN to activate the pump.

The data communication device provides a (possibly asynchronous) data link, allowing information to travel between the fueling station and a distant control & operations center. Since the customer or consumer supplies the communication device, the fueling station need not include such capabilities itself and its cost may be reduced. In addition, in certain modes, the communication device can provide a time-shifting function so that operations can proceed even though long-range data communications (via, e.g., a cellular telephone network) are not available at a remote fueling-station location where the embodiment is deployed.

Figure 2:
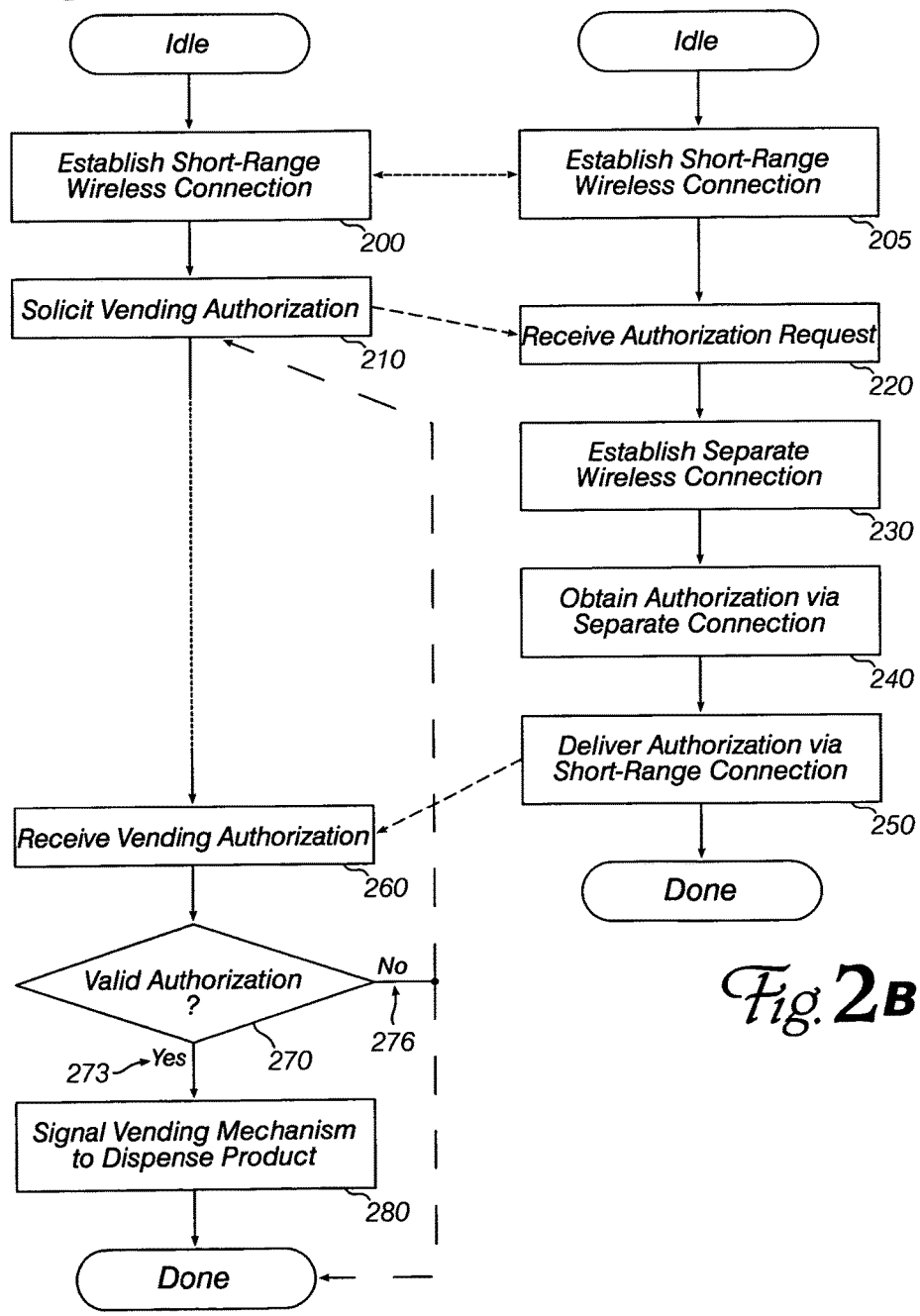
FIGS. 2A and 2B are flow charts showing cooperating interactions between two portions of an embodiment.

FIGS. 2A and 2B are flow charts outlining operations of cooperating portions of an embodiment of the invention. FIG. 2A describes the activities of the "fueling station" portion, while FIG. 2B describes the activities of the "consumer" portion.

Initially, both portions are in an idle state. When the consumer portion comes within range of the short-range wireless transceivers of an embodiment, a connection is established (200, 205). Either side may initiate the connection. A preferred wireless connection is a Bluetooth® connection. Other suitable connections are WiFi and infrared. Preferably, the connection is low power, has a range less than about 20 m, and uses hardware features that are widely available on common portable data communication devices such as cellular telephones, tablets, personal digital assistants (PDAs) and laptop computers.

Once a short-range connection is established, the fueling station solicits a vending authorization from the connected portable data communication device (210). The communication device receives this request (220) and establishes a separate wireless connection (230) with a remote server whose operations are not shown here. The communication device receives a vending authorization from the remote server via the separate wireless connection (240) and delivers the authorization to the fueling station via the short-range connection (250).

The fueling station receives the authorization (260) and checks it for validity (270). If it is valid (273), then a signal is given to a vending mechanism, causing it to deliver product to the consumer. For example, an embodiment may close an electronically-activated switch (105) that energizes a pump (113) to deliver fuel from a reservoir (115). If the authorization is invalid (276), then the fueling station may repeat the attempt to obtain a vending authorization (210) or simply terminate the transaction. When a transaction is completed (either successfully or unsuccessfully), the data connection over the short-range wireless communication link is terminated.

It is important in an embodiment that the functions of the consumer portion (i.e., those of FIG. 2B) may be performed by different devices. That is, not only should two different individuals' cell phones operate satisfactorily in this role, but one individual's laptop computer should be able to replace another individual's cell phone.

The consumer role is typically implemented by data and instructions to cause a programmable processor to perform the operations described. The programmable processor is typically a component of a consumer's portable communication device, which may be a cell phone, satellite phone, PDA, or other device having suitable capabilities. For example, some vehicles now include both short-range wireless connectivity (e.g., Bluetooth® or WiFi) and satellite or cellular connectivity. Such a vehicle—equipped with suitable software—would be able to participate in an embodiment.

It is appreciated that the operations by which the consumer device obtains the vending authorization (i.e., 230 & 240) may be performed asynchronously with the operations of delivering such authorization to the fueling station. For example, in a remote location where a separate wireless connection cannot be established, the consumer's portable communication device may deliver a previously-acquired vending authorization via the short-range wireless connection.

Figure 3:
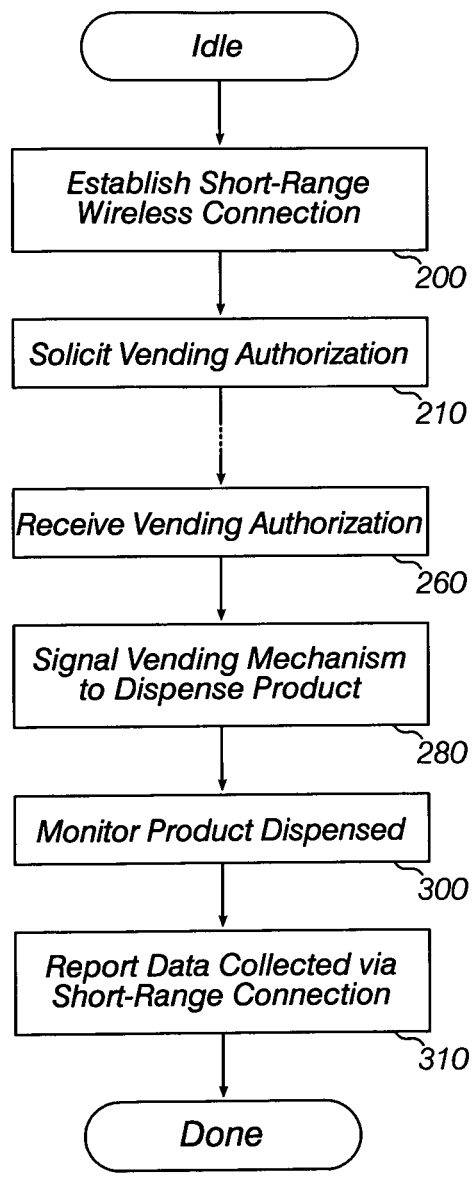
FIG. 3 is a flow chart of additional operations an expanded embodiment may perform.

FIG. 3 is a flow chart showing operations of a more-sophisticated fueling-station embodiment. (The consumer portion interacts as described here, but its operations are not depicted in the flow chart.)

As before, a short-range wireless communication channel is established (200). The vending authorization is solicited (210) and received (260), and if it is valid, the vending mechanism is signaled to dispense the product (280). This embodiment also monitors the product being dispensed (300). For example, it may measure a number of gallons of liquid fuel delivered by the pump or cubic feet of gas permitted to exit a pressurized tank. Other information may also be collected: time of day, environmental conditions, system status, reservoir state, and so on. This information may be reported to the portable data communication device over the short-range wireless connection (310). The data communication device may in turn report the information to a central operations server immediately, or later when a long-range communication channel becomes available. To prevent tampering with the report from the fueling station, the reported data may be signed with a cryptographic hash to prevent undetected alteration, or the entire report may be encrypted.

Figure 4:
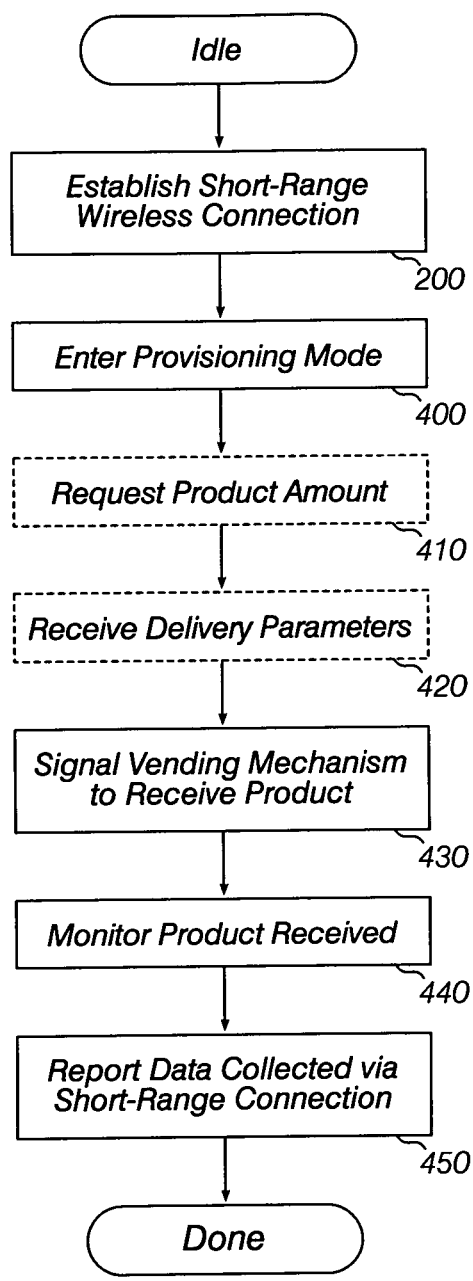
FIG. 4 is a flow chart showing another mode of operation of an embodiment.

An embodiment may also include a provisioning function, as outlined in FIG. 4. Again, a short-range wireless communication channel is established (200), but in this sequence of operations, the computing device enters a provisioning mode (400), perhaps as a result of receiving such a command from the connected portable communication device. The embodiment may request an amount of product to be delivered (410) and/or be informed of the amount the provisioner will deliver (420).

The vending mechanism is signaled to receive product (430). For example, a two-way electronically controlled switch may be activated to operate a pump in reverse, transferring liquid fuel from a delivery tank into the storage reservoir. The computing device may monitor the product thus delivered (440) and report the results and conditions of delivery via the short-range wireless communication channel (450). These data may be cryptographically signed and/or encrypted, as before. The delivery results may be transmitted to a central operations server immediately or later by the portable data communications device.

FIG. 5 is a block diagram of an exemplary embodiment of the invention. The heart of the embodiment is a computer processor 500 including a programmable processor, volatile and non-volatile memory, and signaling interfaces to communicate with other modules. The programmable processor operates according to instructions and data stored in the memories to perform methods as outlined in the foregoing flow charts. A microcontroller integrating the processor, memories and input/output ("I/O") interfaces is a preferred choice for computer processor 500. A microcontroller such as a member of the PIC32MX3xx/4xx series of high-performance MIPS32® M4K® 32-bit RISC processors from manufacturer Microchip Technology Inc. will work well.

Processor 500 can access at least one short-range wireless communication interface. In this figure, both Bluetooth® and WiFi interfaces (510, 520) are shown. This embodiment also includes a user display 530, which may be, for example, an LED or LCD unit. The display can present instructions and status information to a user.

The embodiment includes an electronically-controlled vending switch 540. This may be, for example, a solid-state or electromechanical relay, and it may function as a contact closure device to activate a pump or other dispensing mechanism, or it may itself complete a circuit between a power supply such as a 120VAC or 240VAC power source and a pump, electronically-controlled valve or other device that operates using such power. An electromechanical relay such as the TE Connectivity Ltd. T9AS1D12-12 (12V coil, 30 A contacts) is suitable.

The embodiment may also include a volume detection device (a liquid or gas flow meter) 550, or it may only provide an input interface to receive data from an existing flow meter that is part of a larger system where the embodiment is installed. In either case, volume detection device 550 permits the embodiment to acquire information about the amount of product being dispensed.

An embodiment may also include a keypad for entering information, or a mechanical override such as a keyed lock. However, in a preferred embodiment, the system communicates with a data communication device such as a cell phone or PDA over the short-range wireless communication link, and all user input and display functions are performed by cooperating software executing on the data communication device.

Note that the software (data and instructions) controlling computer processor 500 are separate and distinct from the software (data and instructions) that execute on the data communications device. In some embodiments, processor 500 may store a copy of the data communications device software locally, and transmit this software to the data communications device if it is not installed there already. In other embodiments, the consumer-side software may be obtained from a distribution site such as an "app store." Note also that there are likely to be different implementations of the consumer side software to suit the device(s) on which these programs are intended to execute. For example, an Android® phone would use different software than an Apple® iPhone®. However, either phone—configured with suitable software—could serve as the data communication device in an embodiment because either one would implement the appropriate protocols to interact with computer processor 500.

FIG. 6 is another block diagram showing how two different data communication devices may fill the same role (at different times) in the operation of an embodiment. The fueling station portion of the embodiment 600 is as described previously: a programmable processor 602 controls a short-range wireless transceiver 604 and a switch 606, which in turn controls a pump 608. At various times, fueling station 600 may be in communication with one portable data communication device 610 or a different portable data communication device 620. Each data communication device comprises its own programmable processor 612, 622; a short-range wireless transceiver 614, 624 that can communicate with transceiver 604; a different wireless interface 616, 626 such as a cellular network interface or a satellite interface; and a user interface 618, 628 such as a touchscreen or a screen and keyboard.

Also depicted in this figure are some elements of a control center 630: yet another programmable processor 632, a data interface 635 for communicating over a distributed data network 660 such as the Internet, and a database 637 for storing information about the state and operations of the system.

Each of the programmable processors operates according to data and instructions that cause the processor to perform operations along the lines described above. At some times, processor 602 may communicate with processor 612 over a connection between short-range wireless interfaces 604 and 614, while at other times processor 602 may communicate with processor 624 over a connection between short-range wireless interfaces 604 and 624. In either event, the system can interact with the person who brought the data communication device in range of the short-range wireless interfaces via messages and input on user interface 618 or 628.

The data communication device in use can communicate with programmable processor 632 via its own "different wireless" interface (616 or 626), through the distributed data network 660, and the control center 630's data interface 635. In some situations, data from fueling station 600 may be passed through to control center 630 by one of 610 or 620; or data from control center 630 may be passed back to fueling station 600 in the opposite direction. In particular, when portable data communications device 610 or 620 provides a vending authorization to fueling station 600, it is an example of information being passed from control center 630 to fueling station 600.

Several different data connections are shown in this figure: short-range wireless connections 641 and 642, and a different wireless connection 650 between portable data communications device 610 and control center 630. (Portable data communications device 620 may also communicate with control center 630, but this connection is not indicated in the figure.)

An embodiment of the invention may be a machine-readable medium, including without limitation a non-transient machine-readable medium, having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a non-transient machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing computer instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that liquid fuel and other products can also be dispensed and accounted for by software and hardware that distribute the functions of embodiments of this invention differently than herein described. Such variations and implementations are understood to be captured according to the following claims.

I claim:

1. A fuel-dispensing and accounting system consisting of:
   a first consumer device comprising:
      a first short-range wireless transceiver;
      a first long-range wireless transceiver different from the first short-range wireless transceiver; and
      a first general-purpose computing device coupled to the first short-range wireless transceiver and the first different long-range wireless transceiver, said first general-purpose computing device configured with first software;
   a second consumer device comprising:
      a second short-range wireless transceiver;
      a second long-range wireless transceiver different from the second short-range wireless transceiver; and
      a second general-purpose computing device coupled to the second short-range wireless transceiver and the second different long-range wireless transceiver, said second general-purpose computing device configured with second software; and
   a fuel-dispensing controller consisting of:
      a third short-range wireless transceiver;
      an electronically-controlled switch connected to an electrically-operated fluid pump; and
      a third general-purpose computing device coupled to the third short-range wireless receiver and the electronically controlled switch, said third general-purpose computing device configured with third software;
   wherein the fuel-dispensing controller and an active device chosen from the first consumer device and the second consumer device interact under control of the third software and either the first software of the first consumer device or the second software of the second consumer device to perform operations comprising:
      establishing a first connection between a short-range wireless transceiver of the active device and the third short-range wireless transceiver;
      establishing a second, different connection between a long-range wireless transceiver of the active device and a remote server;
      obtaining a vending authorization from the remote server transmitted over the second different connection and received by the active device;
      transmitting the vending authorization from the active device over the first connection to the fuel-dispensing controller;
      after receiving the vending authorization at the fuel-dispensing controller, activating the electronically-controlled switch to engage the electrically-operated fluid pump;
      determining a quantity of fuel dispensed by the electrically-operated fluid pump;
      transmitting the quantity of fuel dispensed from the fuel-dispensing controller to the active device over the first connection; and
      transmitting the quantity of fuel dispensed from the active device to the remote server over the second different connection.

2. The fuel-dispensing and accounting system of claim 1 wherein the active device is a first active device, and wherein after the fuel dispensing controller and the active device complete an establishing, establishing, obtaining, transmitting and activating interaction, the fuel dispensing controller discontinues interaction with the first active device and then commences interaction with a second active device, said second active device chosen from the first consumer device and the second consumer device, wherein the second active device is different from the first active device.

3. The fuel-dispensing and accounting system of claim 1, wherein the first connection and the second, different connection are concurrently active.

4. The fuel-dispensing and accounting system of claim 1, wherein the first software is incompatible with the second consumer device and the second software is incompatible with the first consumer device.

5. The fuel-dispensing and accounting system of claim 1, wherein the first consumer device is an Apple® iPhone® device.

6. The fuel-dispensing and accounting system of claim 1, wherein the second consumer device is an Android® device.

7. The fuel-dispensing and accounting system of claim 1, wherein the first consumer device is a vehicle.

8. The fuel-dispensing and accounting system of claim 1, wherein the first, second and third short-range wireless transceivers are all Bluetooth® transceivers.

9. The fuel-dispensing and accounting system of claim 1, wherein the first, second and third short-range wireless transceivers are all WiFi® transceivers.

10. The fuel-dispensing and accounting system of claim 1, further comprising:
   the electrically-operated fluid pump coupled to the electronically-controlled switch; and
   a reservoir coupled to the electrically-operated fluid pump, said reservoir containing a product that is dispensed by the electrically-operated fluid pump when the electronically controlled switch is activated.

11. A liquid fuel dispensing and accounting system comprising:
   a control center including a programmable processor, a database, and a control-center data communication interface; and
   a fueling station including a liquid fuel reservoir, a pump, and a pump controller having a pump-controller data communication interface, said control-center data communication interface and said pump-controller data communication interface not capable of direct communication and not in continuous indirect communication, wherein
   a user of the fueling station supplies a mobile device that permits temporary data communication between the control-center data communication interface and the pump-controller data communication interface only while the user is operating the fueling station, and wherein
   the programmable processor of the control center and the pump controller communicate while the user is operating the fueling station to perform coordinated actions comprising:
   sending a vending authorization from the control center to the fueling station, said vending authorization to enable the pump to deliver liquid fuel from the liquid fuel reservoir;
   pumping a quantity of liquid fuel from the liquid fuel reservoir;
   reporting the quantity of liquid fuel from the fueling station to the control center; and
   terminating the temporary data communication between the control-center data communication interface and the pump-controller data communication interface.

* * * * *